United States Patent [19]
Cassel

[11] 3,977,800
[45] Aug. 31, 1976

[54] CONNECTOR

[76] Inventor: Joe R. Cassel, P.O. Box 25695, Denver, 2027, Transvaal, South Africa

[22] Filed: Nov. 26, 1974

[21] Appl. No.: 527,281

[30] Foreign Application Priority Data
  Feb. 19, 1974 South Africa.......................... 74/1074
  Mar. 14, 1974 South Africa.......................... 74/1689

[52] U.S. Cl. ............................... 403/172; 403/297
[51] Int. Cl.² ........................................... F16B 7/00
[58] Field of Search ........... 403/170, 171, 172, 173, 403/174, 175, 176, 177, 178, 297, 295, 290

[56] References Cited
UNITED STATES PATENTS
| | | | |
|---|---|---|---|
| 1,025,759 | 5/1912 | McCluskey | 403/298 |
| 2,990,203 | 6/1961 | Grover et al. | 403/174 |
| 3,485,519 | 12/1969 | Chiu | 403/176 X |

FOREIGN PATENTS OR APPLICATIONS
| | | | |
|---|---|---|---|
| 1,276,390 | 10/1961 | France | 403/176 |
| 521,898 | 3/1955 | Italy | 403/171 |
| 303,955 | 3/1955 | Switzerland | 403/173 |
| 1,016,582 | 1/1966 | United Kingdom | 403/290 |
| 14,677 | 1902 | United Kingdom | 403/290 |

*Primary Examiner*—Andrew V. Kundrat
*Attorney, Agent, or Firm*—Browdy and Neimark

[57] ABSTRACT

This invention relates to a connector for structural members such as tubes, several of which are brought together at a corner zone or the like. The connector is formed as an extrusion including a body portion from which fastening formations, in the nature of bifurcations, extend in each of three directions. Where the fastening formations extend all in the same general plane the connector may be extruded in one piece but where one or more fastening formations extend in different planes to others, the connector is extruded in two or more parts, one part including the body and two or more fastening formations extending in one plane and another part comprising a further fastening formation which is secured to the body so as to extend therefrom in the different plane.

5 Claims, 6 Drawing Figures

CONNECTOR

This invention relates to connector means for structural elements. In particular the invention relates to an extrudable connector made of aluminum.

In the manufacture of furniture or other structures with aluminum frameworks it has been conventional to join the framework with a connector having fastening formations rightangularly disposed and which engage lockingly within elongated aluminum tubes constituting structural elements of the framework. The known connectors are cast from steel or the like material, and this in itself is a relatively costly manner of manufacture. The conventionally known connector is one where the fastening formations are constituted by two mating half sections. An allen screw or the like is then arranged to urge the two half sections laterally apart thereby enforcing their outer surfaces to lockingly engage on the inner surfaces of the tubular framework.

It is an object of the present invention to provide a connector which can be manufactured by an extrusion process and one which contains both by means and by volume less material than known connectors for the above kind of purpose.

According to the invention there is provided a connector member including a body portion and fastening formations extending in three or more directions from the body, the fastening formations comprising spaced substantially parallel limbs for stable engagement with structural elements to be connected.

Further according to the invention the connector includes means to splay the limbs for effecting a force fit of the fastening formations within hollow structural elements to be connected.

For example the means to splay the limbs of a fastening formation comprises a screw engageable in a threaded hole in one limb and adapted to be screwed into abutment with the other limb of the fastening formation.

Alternatively, the means to splay the limbs of a fastening formation comprises a wedge member and a screw or the like to force the wedge member into wedging relationship with the limbs.

As a further alternative the external surface of one or both of the limbs may be profiled so that on insertion of the limbs into the bore of a hollow structural element the limbs are forced together and a corresponding outward wedging of the limbs against the wall of the structural element is obtained. For example one or both limbs may have external arcuate surfaces which slidingly engage the structural element bore as they are nipped together on being forced into the element. If desired the latter may also be provided with an internal formation arranged to be gripped in a pincer like way by the limbs as they are forced together.

In a preferred form of the invention the limbs of the fastening formations include external gripping formations for engagement with structural elements to be connected. These external gripping formations may comprise lateral ribs formed within the bore of tubular structural elements to be connected.

Also in a preferred form of the invention the body member is substantially a square block, and the outer surface of the limbs of the fastening formations are substantially flat.

Also according to the invention at least two fastening formations are formed integrally with the body portion and at least one other fastening formation is separately secured to the body. Thus it will be understood that the connector portion comprising a body and fastening formations defined by spaced flat limbs extending laterally from the body and lying in planes parallel to the direction of travel through an extrusion orifice may be extruded in one piece. The other formation/s which extend from the body parallel to the direction of travel through an extrusion orifice may be separately secured to the body portions. Thus the fastening formations which are integral with the body portion extend from the latter within a common plane and the fastening formations which are separately secured to the body extend within a plane or planes transverse the said common plane. For example the connector may include between two and four fastening formations integral with the body, and one or two fastening formations separately secured to the body.

Preferably the said other fastening formation/s is or are secured to the body by an adhesive. It is possible however to provide a threaded stem on the base of such other fastening formation which screws into a tapped hole in the body. If desired both adhesive and screw means may be used to secure the separate fastening formations.

Preferably also the fastening formations extend from the body at substantially right angles to all adjacent formations.

In further preferred forms of the invention the body portion is cubic, preferably a square cube and the fastening formations extend from faces of such cube.

The invention includes within its scope a method of forming a connector member including the steps of extruding an elongated element comprising a body portion with at least one fastening formation extending laterally therefrom relative to the direction of travel of the element through the extrusion orifice, cutting a connector member of suitable length from the element and securing at least one further fastening formation to the body portion.

In another manner of forming the connector, an elongated element is extruded which comprises a body portion with at least one fastening formation extending laterally therefrom relative to the direction of travel of the element through the extrusion orifice and a further monolithic fastening formation extending parallel from the body relative to such direction. After extrusion the element may be passed to a punching machine which removes a central position from the monolithic formation in order to form spaced limbs.

Further aspects of the invention will be apparent from the description below which is given to illustrate the invention with reference to the accompanying drawings in which.

Figure 1:
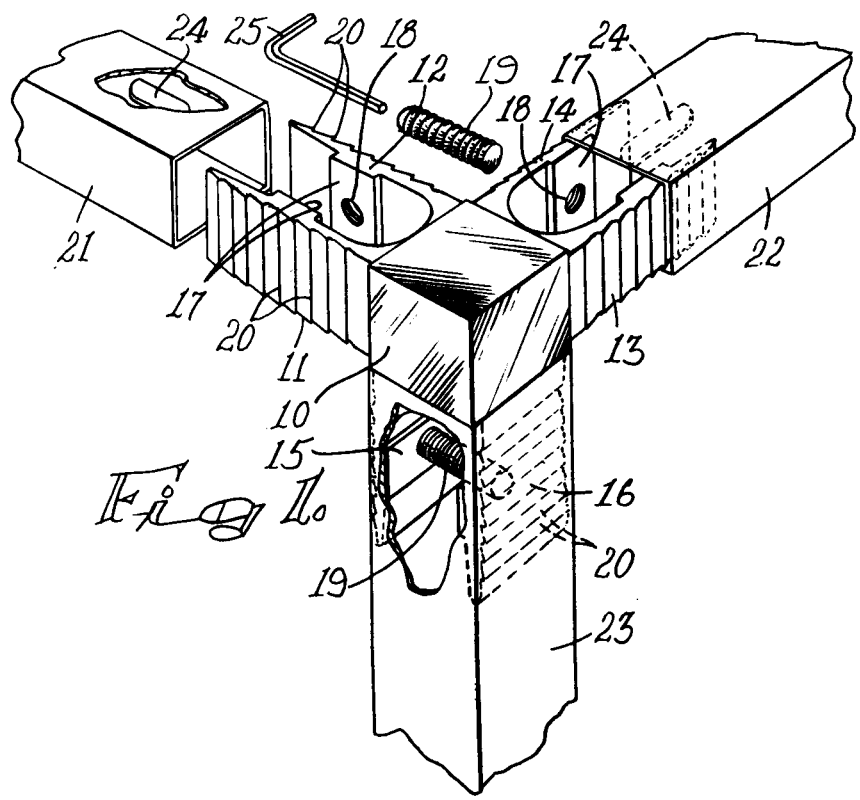
FIG. 1 is a perspective view with parts broken away of a connector in accordance with the invention showing tubular framework members to be joined by the connector.

Referring to FIG. 1 of the drawings, an extrudable connector is defined by a substantially square cube body portion 10 from two adjacent faces of which there extend fastening formations comprised by a pair of limbs 11 and 12 extending in a first direction and a second pair of limbs 13 and 14 extending in a second direction at right angles to limbs 11 and 12. These limbs 11 to 14 are integral with the body 10 unlike the limbs 15 and 16 of a further fastening formation which is adhesively secured to the body 10.

On the inside faces of limbs 11 to 16 there are provided thickened zones 17 through which there are provided threaded apertures 18 to receive allen screws 19. On the outer faces of the limbs 11 to 16 there are gripping formations 20. In order to form a three-way joint between tubular structural elements 21, 22 and 23 the latter are thrust endwise over the limbs 11, 12; 13, 14; and 15, 16 respectively until the tube ends abut against the body portion 10.

Slotted apertures 24 in the tubes permit access to the aperture 18 by the screws 19 and an allen key 25 is used to tighten the screws. By screwing the allen screws 19 downwardly against the opposite limbs of each fastening formation the pairs of limbs are splayed into engaging relationship against the inner walls of tubular members 21 to 23 and in this fashion the fastening formations lock with tubular members.

Figure 4:
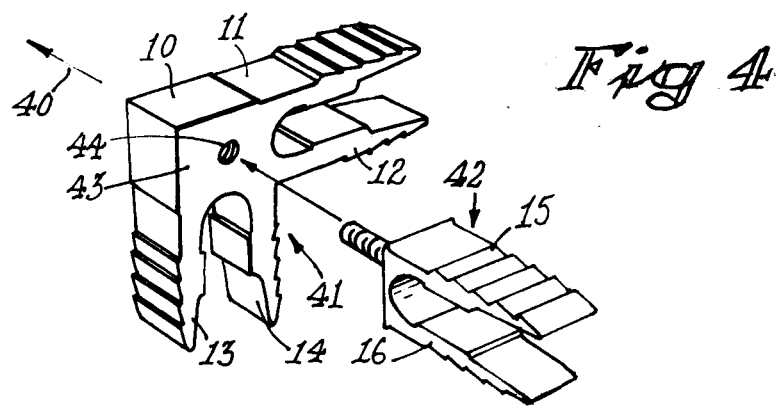
FIG. 4 is a perspective view of a portion of a connector as extruded and with a separate fastening formation adapted to be securable to the connector body.
Figure 5:
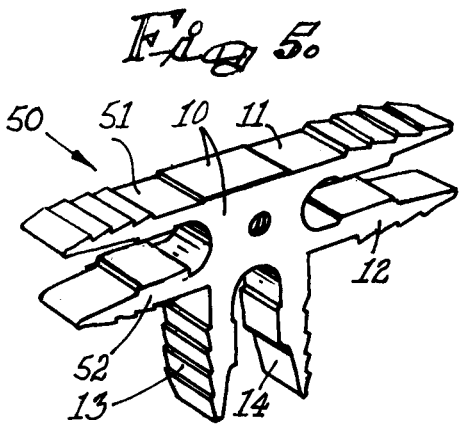
FIG. 5 is a perspective view of an alternative connector portion as extruded.
Figure 6:
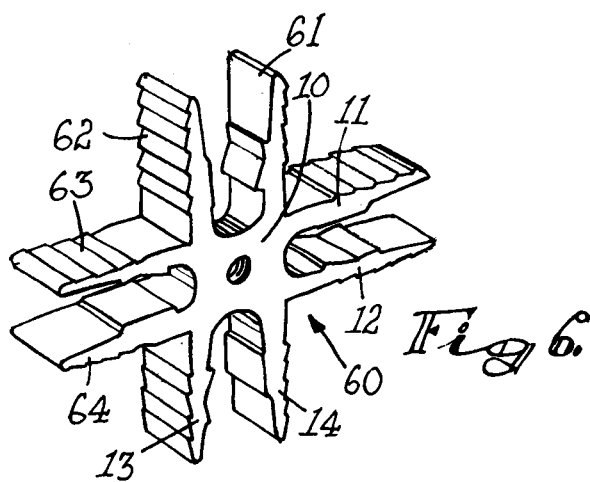
FIG. 6 is a perspective view of yet a further connector portion.

The joint is one which is made of an extrudable aluminum alloy and is extruded in a manner which is best illustrated with reference to FIG. 4. The direction of the extrusion is shown by arrow 40 and as can be seen a connector portion 41 is formed by extruding an elongated element (not shown) comprising the body portion 10 and pairs of flat limbs 11, 12 and 13, 14 lying in planes parallel to the direction of extrusion. It will be understood that the pairs of limbs form fastening formations which so to speak are co-planar. The connector portion 41 is provided by cutting a suitable short length from the extruded elongated element. Thereafter the connector as shown in FIG. 1 is completed by adhesively securing a separately extruded fastening formation 42, which provides the limbs 15, 16 which extend in the direction of arrow 40, to the face 43 of cube 10. If desired a threaded aperture 44 in body 10 may be provided to receive a threaded stem on the base of formation 42 to provide a screw connection instead of or in addition to the adhesive connection. It will be appreciated that the connector portion 41 is not limited to extrusion with the two fastening formations only extending from the body 10. As shown in FIG. 5 a portion 50 is extruded from three formations in a plane and FIG. 6 shows a portion with four formations provided each by two spaced limbs. To these connector portions 41, 50 or 60 there may be secured one formation extending in the direction of extrusion, as with the connector of FIG. 1 or two, one on each side of the cube body 10. Thus a connector according to the invention may be formed to connect anything from three to six structural elements at a joint.

Should a connector be required with limbs 11, 12, 13 and 14 only, then limbs 51, 52, 61, 62, 63 & 64 may be cut from the body zone 10 and the material constituting the latter limbs may be recycled as scrap material. In other forms of the invention the connectors which are extruded may have respectively only the limbs required.

In some cases it may be possible to dispense with the screws 19, in order to splay the limbs of the fastening formations, and simply use an adhesive to unite the limbs and inside surfaces of the tubes 21 to 23.

Figure 2:
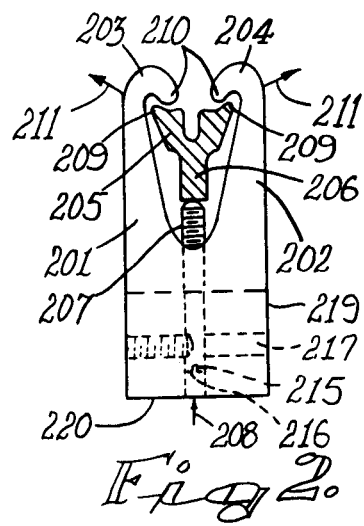
FIG. 2 is a section through an alternative form of connector.
Figure 3:
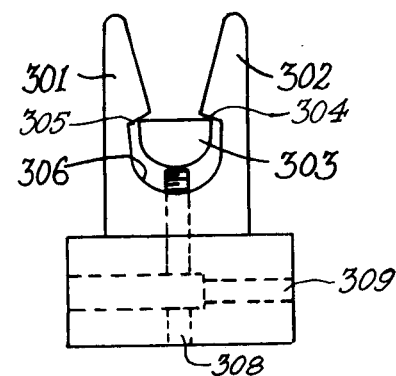
FIG. 3 is a section through a further alternative form of connector.

In alternative arrangements as shown in FIGS. 2 and 3 it will be seen that wedging members are used, in place of allen screws, to splay the limbs of a formation. Thus referring to FIG. 2 the part of the connector there illustrated shows limbs 201 and 202 whose leading ends are provided with hook formations 203 and 204. Between the limbs 201 and 202 and the hook formations 203 and 204 there is disposed a wedging element 205 substantially profiled to mate with the contours defined by the limbs and hook formations. End 206 of the wedging element 205 is adapted to engage the leading end of allen screw 207 such that as the allen screw is urged in the arrowed direction 208 the wedging element 205 is forced into engagement with hook formations 203 and 204.

Zones 209 of the wedging element 205 react with opposite zones 210 of limbs 201 and 202 thereby to force a wedging action as indicated by arrows 211.

The trailing end 215 of allen screw 207 is provided with a suitable allen slot and allen key means inserted through threaded aperture 216 can engage the allen screw and effectively turn the screw 207 to effect the desired wedging action as described above.

Dotted line 217 is illustrative of further apertures to the body member 10 through which an allen key may be made to operate allen screw means for respective limbs directed right-angularly from the faces 219 and 220.

Referring to the embodiment of FIG. 3 the limbs 301 and 302 have a different cross-section and the wedging element 303 is located between the step formations 304 and 305 and the rounded base section 306 of the limbs 301 and 302. The wedging element may be tapped to receive the leading end of the allen key and the allen key may be operated through apertures such as 308, and 309 as described above. The arrangement of FIG. 3 differs from that of FIG. 2 inasmuch as an additional tapping operation (of wedging element 303) may be required to extend perpendicularly to both sides of the plane defined by the limbs and body of the member illustrated in FIG. 2.

Although the invention as illustrated shows two mating pairs of limbs (e.g. limbs 11 and 12) extending in each direction from the body zone 10, quite clearly the one limb could be replaced by a single formation adapted to operate with the remaining limb in a manner to positively locate a tubular element in position relative to the joint. This formation may take the form of a stepped zone on which the tubular formation may rest or a shorter limb. In this case the leading ends of the allen screws will abut against the inner face of the tubular members being locked to that limb zone of the joint.

The joint formation of the invention as extruded is of lighter construction and known joint formation and in this manner it is anticipated that the cost of joints will be accordingly reduced.

I claim:

1. An extruded connector member for connecting hollow structural elements, comprising:
   a body portion;
   three or more fastening formation means, each extending in different directions from said body portion for stable engagement within the hollow structural elements, each of said fastening formation means comprising a pair of spaced, substantially parallel, elongated, relatively flexible limbs, one of said limbs having a threaded hole, said limbs being substantially flat but including gripping formation means for engagement with the interior of the structural elements, said limbs each having a cross-sectional area in a plane facing the body portion, substantially less than the area of spacing between them, each of said fastening formation means which extend from said body portion in a single plane being extruded integrally therewith and each of said fastening formation means extending perpendicular to said plane being separately extruded and separately secured thereto;

step means between said body portion and each of said fastening formation means for providing a surface against which the hollow structural elements abut when properly connected; and screw means for splaying each of said pairs of limbs to effect a force fit of each of said fastening formation means within the structural elements by engaging said threaded hole of one limb and abutting the other limb of each of said fastening formation means.

2. A connector according to claim 1 wherein said fastening formation means which are secured separately to said body portion are secured thereto with adhesives.

3. A connector according to claim 1 further including a securing means, connected between said body portion and said fastening formation means which are secured separately to said body portion, for securing effective location of said fastening formation means on said body portion.

4. A connector according to claim 1, wherein said body portion is cubic and said fastening formation means extend from at least three of the faces of said cube.

5. A connector according to claim 1, wherein said connector is constructed of aluminum.

* * * * *